United States Patent
Suzuki et al.

(10) Patent No.: US 10,431,807 B2
(45) Date of Patent: Oct. 1, 2019

(54) METHOD OF MANUFACTURING LITHIUM-ION SECONDARY BATTERY ELECTRODE

(71) Applicants: TOYOTA JIDOSHA KABUSHIKI KAISHA, Toyota-shi, Aichi (JP); ZEON CORPORATION, Tokyo (JP)

(72) Inventors: Kazuhiro Suzuki, Toyota (JP); Yasuhiro Sakashita, Nisshin (JP); Yuji Shibata, Kawasaki (JP); Takahiro Ogawa, Aiko-gun (JP)

(73) Assignees: TOYOTA JIDOSHA KABUSHIKI KAISHA, Toyota-shi, Aichi-ken (JP); Zeon Corporation, Chiyoda-ku, Tokyo (JP)

(*) Notice: Subject to any disclaimer, the term of this patent is extended or adjusted under 35 U.S.C. 154(b) by 20 days.

(21) Appl. No.: 15/510,274

(22) PCT Filed: Sep. 8, 2015

(86) PCT No.: PCT/JP2015/004576
§ 371 (c)(1),
(2) Date: Mar. 10, 2017

(87) PCT Pub. No.: WO2016/038889
PCT Pub. Date: Mar. 17, 2016

(65) Prior Publication Data
US 2017/0256781 A1    Sep. 7, 2017

(30) Foreign Application Priority Data
Sep. 12, 2014   (JP) .................. 2014-187015

(51) Int. Cl.
*H01M 4/04* (2006.01)
*H01M 10/0525* (2010.01)
*H01M 4/139* (2010.01)

(52) U.S. Cl.
CPC ........ *H01M 4/0435* (2013.01); *H01M 4/043* (2013.01); *H01M 4/0404* (2013.01);
(Continued)

(58) Field of Classification Search
CPC .................................................. H01M 4/0435
See application file for complete search history.

(56) References Cited

U.S. PATENT DOCUMENTS 3,002,834 A * 10/1961 Di Pasquale ............. B22F 7/04
                                                            419/43
4,765,598 A *  8/1988 Magnuson .............. B22F 3/004
                                                            266/103
(Continued)

FOREIGN PATENT DOCUMENTS

CN      1956243 A     5/2007
CN    101207195 A     6/2008
(Continued)

*Primary Examiner* — Maria Laios
(74) *Attorney, Agent, or Firm* — Sughrue Mion, PLLC (57) ABSTRACT

The present invention discloses a method of manufacturing a lithium-ion secondary battery electrode. The method includes the steps of: supplying composite particles (1), each containing an active material (2) and a binder (4), onto a sheet collector (42); and rolling the composite particles (1) supplied onto the collector (42), thus forming an active material layer (44). The rolling step includes a first rolling sub-step involving first rolling, and a second rolling sub-step to be performed after the first rolling sub-step. Rubber rolls (R1) are preferably used in the first rolling sub-step.

14 Claims, 5 Drawing Sheets

(52) U.S. Cl.
CPC ....... *H01M 4/0409* (2013.01); *H01M 4/0416* (2013.01); *H01M 4/139* (2013.01); *H01M 10/0525* (2013.01); *Y02T 10/7011* (2013.01)

(56) References Cited

U.S. PATENT DOCUMENTS

| | | | | |
|---|---|---|---|---|
| 5,616,366 | A * | 4/1997 | Olsen | H01M 4/04 427/365 |
| 6,730,440 | B1 * | 5/2004 | Bauer | H01G 9/155 429/231.9 |
| 2002/0168569 | A1 * | 11/2002 | Barriere | H01M 2/164 429/217 |
| 2005/0241137 | A1 | 11/2005 | Suzuki et al. | |
| 2005/0271798 | A1 * | 12/2005 | Zhong | H01G 11/42 427/58 |
| 2011/0269017 | A1 | 11/2011 | Sakamoto | |
| 2014/0342225 | A1 | 11/2014 | Isshiki et al. | |
| 2015/0255795 | A1 | 9/2015 | Sano et al. | |

FOREIGN PATENT DOCUMENTS

| | | | |
|---|---|---|---|
| JP | 4-332467 | A | 11/1992 |
| JP | 2000-331673 | A | 11/2000 |
| JP | 2002-124252 | A | 4/2002 |
| JP | 2003-317707 | A | 11/2003 |
| JP | 2005-340188 | A | 12/2005 |
| JP | 2008-218134 | A | 9/2008 |
| JP | 2013012327 | A | 1/2013 |
| JP | 5158452 | B2 | 3/2013 |
| JP | 2013-065478 | A | 4/2013 |
| JP | 2013-077559 | A | 4/2013 |
| JP | 2013-077560 | A | 4/2013 |
| JP | 2013-131342 | A | 7/2013 |
| JP | 2014-107166 | * | 6/2014 ............. H01M 4/04 |
| JP | 2014-107166 | A | 6/2014 |
| JP | 2015-230747 | A | 12/2015 |
| WO | 2014/051020 | A1 | 4/2014 |

* cited by examiner

METHOD OF MANUFACTURING LITHIUM-ION SECONDARY BATTERY ELECTRODE

CROSS REFERENCE TO RELATED APPLICATIONS

This application is a National Stage of International Application No. PCT/JP2015/004576, filed on Sep. 8, 2015, which claims priority from Japanese Patent Application No. 2014-187015, filed on Sep. 12, 2014, the contents of all of which are incorporated herein by reference in their entirety.

TECHNICAL FIELD

The present invention relates to methods of manufacturing lithium-ion secondary battery electrodes. More specifically, the present invention relates to a method of manufacturing a lithium-ion secondary battery electrode including a composite particle containing an active material and a binder, for example. This application claims priority to Patent Application No. 2014-187015 filed in Japan on Sep. 12, 2014, the entire contents of which are hereby incorporated by reference.

BACKGROUND ART

An electrode used in a lithium-ion secondary battery includes an electrode active material layer on a sheet collector. Such an electrode active material layer is usually formed as follows: an electrode material-containing an active material particle is dispersed in a liquid medium to prepare an active material layer-forming slurry, and the slurry is supplied onto a collector, dried, and then compacted. Alternatively, such an electrode active material layer may be formed without the use of a liquid medium, in which case a drying step is eliminated, thus saving energy and reducing manufacturing cost. For example, Patent Document 1 discloses a method involving supplying composite particles, made by mixing and granulating active material particles and a binder at a predetermined ratio, onto a surface of a collector, and rolling the composite particles while applying heat thereto, thus manufacturing an electrode. Patent Document 2 discloses a method involving preparing active material particles coated with conductive metal, and pressurizing the active material particles and a collector while sintering the active material particles so that the active material particles and the collector are combined with each other, thus manufacturing an electrode.

CITATION LIST

Patent Literature

[PTL 1] Japanese Patent Application Publication No. 2005-340188
[PTL 2] Japanese Patent Application Publication No. 2003-317707

SUMMARY OF INVENTION

Technical Problem

To increase the capacity of a lithium-ion secondary battery including an electrode such as one mentioned above, active material particles must become dense in an electrode active material layer. Raising pressure during the rolling step or pressurizing step is effective to increasing the density of the active material particles. Another possible approach is to use a high tap density material as active material particles.

Unfortunately, raising pressure during the rolling step or pressurizing step causes cracking in the active material particles. Such cracking may disadvantageously lead to degradation in storage characteristics of a resulting battery, for example. Significantly increasing the tap density of active material particles is difficult, which may make it hard for such active material particles to sufficiently contribute to higher capacity.

Accordingly, the objective of the present invention is to provide a method of manufacturing an electrode for a lithium-ion secondary battery that enables high capacity without any degradation in storage characteristics.

Solution to Problem

In order to overcome the above objectives, a preferred embodiment of the present invention provides a method of manufacturing a lithium-ion secondary battery electrode. The electrode manufacturing method includes: supplying composite particles, each containing an active material and a binder, onto a sheet collector; and rolling the composite particles supplied onto the collector to form an active material layer. The rolling step includes a first rolling sub-step involving first rolling, and a second rolling sub-step to be performed after the first rolling sub-step.

The technique disclosed herein involves rolling the composite particles supplied onto the collector, thus forming the active material layer in which the composite particles are bonded to each other and combined with the collector. Rolling is performed more than once in the rolling step. This increases the density of the composite particles not all at once but gradually, and thus increases the density of the resulting active material layer while preventing cracking in the active materials. Consequently, an electrode for a high-capacity lithium-ion secondary battery is manufactured.

According to another preferred embodiment disclosed herein, the method preferably further includes flattening the composite particles, supplied onto the collector, using a squeegee. The flattening step preferably precedes the first rolling sub-step.

This embodiment makes it possible to uniformly supply a suitable amount of the composite particles onto the collector prior to the rolling in the first rolling sub-step. Consequently, this method enables manufacture of an electrode while preventing variations in the amount of the composite particles per unit area (i.e., the weight per unit area of the composite particles).

According to still another preferred embodiment disclosed herein, the method preferably further includes controlling a vertical position of the squeegee, thus adjusting an amount of the composite particles supplied onto the collector.

This embodiment makes it possible to supply a more suitable amount of the composite particles onto the collector on a per unit area basis. Consequently, this method enables manufacture of an electrode with a capacity (or a weight per unit area) suitable for a desired electrode structure.

According to yet another preferred embodiment disclosed herein, rolling is preferably performed more than once in the second rolling sub-step.

This embodiment further increases the density of the composite particles in the active material layer while preventing cracking in the active materials.

According to still yet another preferred embodiment disclosed herein, rubber rolls are preferably used in the first rolling sub-step.

In this embodiment, rubber rolls are used to perform the first rolling, thus relatively softening the impact on the composite particles, and increasing the density of the composite particles while preventing cracking in the active materials in the composite particles.

According to another preferred embodiment disclosed herein, the second rolling sub-step preferably includes performing rolling using at least porous rolls or suction rolls.

This embodiment makes it possible to form the active material layer whose quality of weight per unit area is high while more effectively preventing cracking in the active materials.

According to still another preferred embodiment disclosed herein, at least one of the first rolling sub-step and the second rolling sub-step preferably is heat-rolling.

This embodiment enables the composite particles to firmly bond to each other to form the active material layer.

According to yet another preferred embodiment disclosed herein, the method preferably further includes measuring a weight per unit area of the composite particles supplied onto the collector, and adjusting an extent of the rolling in the first rolling sub-step and/or the second rolling sub-step on the basis of the measured weight per unit area. This step is preferably performed at any point between the supplying step and the second rolling sub-step.

This embodiment enables, for example, in-line control of the weight per unit area of the active materials even in manufacturing an elongated electrode, thus making it possible to stably manufacture a high-quality electrode.

DESCRIPTION OF EMBODIMENTS

Hereinafter, referring to the drawings where appropriate, preferred embodiments of a method of manufacturing a lithium-ion secondary battery electrode disclosed herein will be described in detail. Note that requirements for the present invention, other than those particularly mentioned herein, may be understood to be design requirements to those skilled in the art in this field. Among these are general requirements for the structure of a lithium-ion secondary battery, and an operating method thereof, for example. Also note that each diagram is a schematic representation. For example, dimensions (e.g., length, width, and thickness) in each diagram do not reflect actual dimensions. Similar components and portions are identified by the same reference signs, and description thereof will be omitted or simplified if deemed redundant.

As used herein, the term "lithium-ion secondary battery" refers to a repeatedly chargeable and dischargeable secondary battery that utilizes lithium ions as electrolytic ions (charge carriers), and that is charged and discharged by movement of electric charges caused by movement of the lithium ions between positive and negative electrodes. A battery (such as a lithium-ion polymer secondary battery) which is generally referred to as a "lithium secondary battery" is subsumed under the category of lithium-ion secondary batteries, and may be a typical example of a lithium-ion secondary battery described herein.

An exemplary preferred structure of a lithium-ion secondary battery in which a lithium-ion secondary battery electrode manufactured by the inventive method may suitably be used will first be described, and then the electrode manufacturing method disclosed herein will be described. Lithium-ion secondary battery electrode(s) manufactured by the inventive method may suitably be used as a positive electrode and/or a negative electrode of a lithium-ion secondary battery, for example.

Lithium-Ion Secondary Battery

Figure 3:
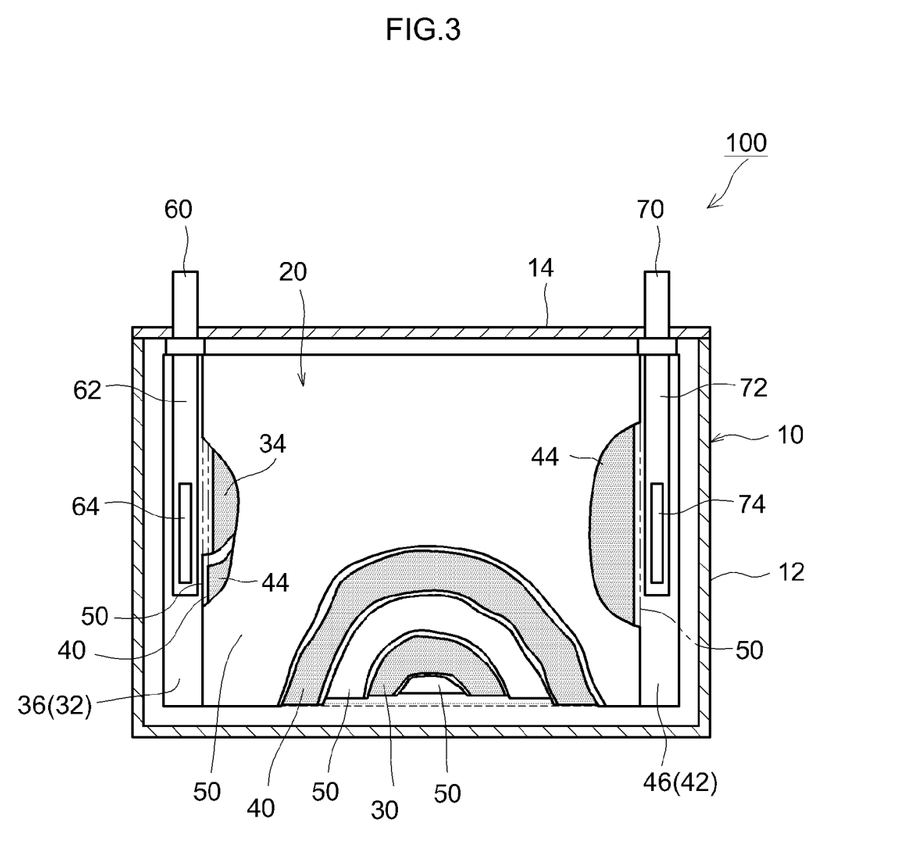
FIG. 3 is an exemplary schematic cross-sectional view of the structure of a lithium-ion secondary battery.
Figure 4:
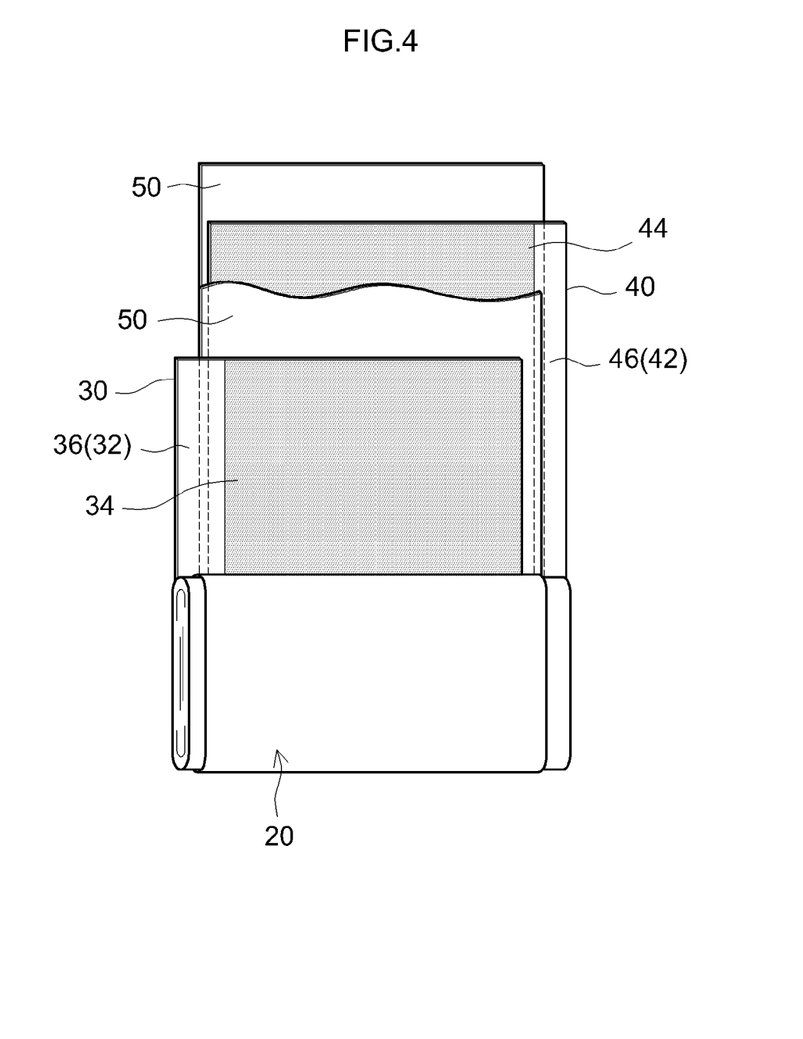
FIG. 4 is a schematic diagram illustrating the structure of a wound electrode assembly.

FIG. 3 is a schematic cross-sectional view of the structure of a lithium-ion secondary battery 100. FIG. 4 is a schematic diagram illustrating the structure of an electrode assembly 20 serving as an electric power generating element to be provided in the lithium-ion secondary battery 100. Note that the lithium-ion secondary battery 100 illustrated in FIG. 3 is merely an example of a lithium-ion secondary battery in which an electrode manufactured by the inventive method may be used. This means that the use of an electrode manufactured by the inventive method is not limited to a lithium-ion secondary battery such as the one illustrated in FIG. 3.

As illustrated in FIG. 3, the lithium-ion secondary battery 100 includes a battery case 10 and the electrode assembly 20. In this example, the electrode assembly 20 is what is called a "wound electrode assembly" provided by winding the electrode assembly 20 having an elongated shape.

Battery Case

The battery case 10 includes a case body 12 and a sealing plate 14. The case body 12 may have a hollow shape with an opening at its one surface. Specifically, the case body 12 according to this embodiment has a flat rectangular parallelepiped shape with an opened surface that serves as the upper surface during normal use of the lithium-ion secondary battery 100. The case body 12 has a rectangular opening. The sealing plate 14 closes the opening of the case body 12. The sealing plate 14 may be a plate having a shape substantially conforming to the opening. The sealing plate 14 is joined to the peripheral edge of the opening of the case body 12 by, for example, welding, thus separating the inside of the battery case 10 from the outside so as to enclose the inside of the battery case 10. The battery case 10 is sealed with the sealing plate 14 after the electrode assembly 20 is housed in the case body 12.

A material for the battery case 10 is not limited to any particular material. For example, the battery case 10 is preferably mainly composed of a lightweight, strong, highly thermally conductive metal material. Examples of such a metal material include aluminum, iron, copper, and alloys thereof. Specific examples of such alloys include an aluminum alloy, stainless steel, and nickel-plated steel. The battery case 10 according to the present embodiment (which includes the case body 12 and the sealing plate 14) is composed of aluminum or an alloy consisting mainly of aluminum. Alternatively, the battery case 10 may be composed of a material other than a metal material, such as resin, according to its intended use.

In the example illustrated in FIG. 3, the sealing plate 14 is provided with positive and negative electrode external connection terminals 60 and 70 which are insulated from the sealing plate 14. The sealing plate 14 may be further provided with a safety vent and a filling port (which are not illustrated). The safety vent may be configured to release the internal pressure of the battery case when the internal pressure is increased to or above a predetermined level (e.g., a set injection-valve opening pressure ranging from about 0.3 MPa to about 1.0 MPa). The filling port may be used to inject an electrolyte solution into the battery case 10 after the battery case 10 is sealed with the sealing plate 14. The filling port is sealed with a lid after the electrolyte solution is injected therethrough.

Electrode Assembly

As illustrated in FIG. 4, the electrode assembly 20 includes a positive electrode 30, a negative electrode 40, and first and second separators 50. The separators 50 are interposed between the positive and negative electrodes 30 and 40, thus insulating the positive and negative electrodes 30 and 40 from each other. In the present embodiment, the positive electrode 30, the negative electrode 40, and the separators 50, each having an elongated strip shape, are stacked and wound so as to provide a "wound electrode assembly". The electrode assembly 20 is, however, not limited to such an example. For example, a plurality of the positive electrodes 30, a plurality of the negative electrodes 40, and the separators 50 may be stacked so as to provide a "stacked electrode assembly".

Positive Electrode

The positive electrode (positive electrode sheet) 30 includes a positive electrode collector 32, and a positive electrode active material layer 34. For example, a metal foil suitable for the positive electrode 30 may preferably be used as the positive electrode collector 32. A strip-shaped aluminum foil with a predetermined width and a thickness of about 15 micrometers, for example, may be used as the positive electrode collector 32. A positive electrode collector portion 36 extends along widthwise one end of the positive electrode collector 32. The positive electrode active material layer 34 is provided on one surface or both surfaces of the positive electrode collector 32 except the positive electrode collector portion 36 of the positive electrode collector 32. As used herein, the term "positive electrode collector portion 36" may refer to a portion of the positive electrode collector 32 where no positive electrode active material layer 34 is present.

The positive electrode active material layer 34 contains positive electrode active materials bound with a binder, and is bonded onto the positive electrode collector 32. As the positive electrode active materials, any one or combination of various conventional positive electrode active materials for a lithium-ion secondary battery may be used. Preferable examples of such materials include: particles of oxide (e.g., lithium transition metal oxide) containing, as constituent metal elements, lithium and a transition metal element, such as a lithium nickel oxide ($LiNiO_2$), a lithium cobalt oxide ($LiCoO_2$), a lithium manganese oxide ($LiMn_2O_4$), or a compound thereof (e.g., $LiNi_{0.5}Mn_{1.5}O_4$ or $LiNi_{1/3}Co_{1/3}Mn_{1/3}O_2$); and particles of phosphate (e.g., lithium transition metal phosphate) containing, as constituent metal elements, lithium and a transition metal element, such as a lithium manganese phosphate ($LiMnPO_4$) or a lithium iron phosphate ($LiFePO_4$). Any one type of these positive electrode active materials may be used alone, or two or more types of these materials may be used in combination. Two or more types of these materials may be used in combination so as to provide a mixture or solid solution, for example. These positive electrode active materials are not limited to any particular particle size. For example, these positive electrode active materials preferably have an average particle size (D50) of about 0.1 micrometers to about 50 micrometers, and more preferably have an average particle size (D50) of about 1 micrometer to about 20 micrometer.

The term "average particle size" used herein represents the particle size (D50) equivalent to a cumulative 50% of the particle size distribution of a standard volume measured by a particle size distribution measurement based on conventional laser diffraction and light-scattering methods.

The positive electrode active material layer 34 may further contain a conductive material. Preferred examples of the conductive material include carbon materials, such as carbon powder and carbon fiber. Examples of carbon powder to be used include: various carbon blacks (such as acetylene black, oil furnace black, graphitized carbon black, carbon black, graphite, and Ketjen black); and graphite powder. One type of such conductive materials may be used alone, or two or more types of such conductive materials may be used in combination.

The mass percentage of the positive electrode active materials in the entire positive electrode active material layer 34 is typically about 50% or more, preferably between about 50% and about 95% inclusive, and more preferably between about 70% and about 95% inclusive. The mass percentage of the conductive material in the positive electrode active material layer 34 is typically between about 0.1% and about 20% inclusive, preferably between about 1% and about 15% inclusive, more preferably between about 2% and about 10% inclusive, and even more preferably between about 3% and about 7% inclusive relative to 100 mass % of the positive electrode active materials. The mass percentage of the binder in the positive electrode active material layer 34 is typically between about 0.01% and about 10% inclusive, preferably between about 0.1% and about 7% inclusive, and more preferably between about 1% and about 5% inclusive relative to 100 mass % of the positive electrode active materials.

The thickness of the positive electrode active material layer 34 is typically 20 micrometers or more, preferably 50 micrometers or more, and typically 200 micrometers or less, preferably 100 micrometers or less. The density of the positive electrode active material layer 34 is not limited to any particular density. For example, the density of the positive electrode active material layer 34 is typically 1.5 $g/cm^3$ or more, preferably 2 $g/cm^3$ or more, and typically 4.5 $g/cm^3$ or less, preferably 4.0 $g/cm^3$ or less. The positive electrode active material layer 34 that meets these conditions enables a resulting battery to deliver high performance (e.g., high energy density and power density).

Negative Electrode

The negative electrode (negative electrode sheet) 40 includes a negative electrode collector 42 and a negative electrode active material layer 44. For example, a metal foil suitable for the negative electrode 40 is preferably used as the negative electrode collector 42. A strip-shaped copper foil with a predetermined width and a thickness of about 10 micrometers, for example, may be used as the negative electrode collector 42. A negative electrode collector portion 46 extends along widthwise one end of the negative electrode collector 42. The negative electrode active material layer 44 is provided on one surface or both surfaces of the negative electrode collector 42 except the negative electrode collector portion 46 of the negative electrode collector 42. As used herein, the term "negative electrode collector portion 46" may refer to a portion of the negative electrode collector 42 where no negative electrode active material layer 44 is present.

The negative electrode active material layer 44 contains negative electrode active materials bound with a binder, and is bonded onto the negative electrode collector 42. As the negative electrode active materials, any one or combination of various conventional negative electrode active materials for a lithium-ion secondary battery may be used. Preferable examples of such materials include: a carbon material, such as artificial graphite, natural graphite, graphite carbon, or amorphous carbon; a lithium transition metal oxide; a lithium transition metal nitride; and a silicon compound. Any one type of these negative electrode active materials may be used alone, or two or more types of these materials may be used in combination. These negative electrode active materials are not limited to any particular particle size. For example, these negative electrode active materials preferably have an average particle size (D50) of about 0.1 micrometers to about 50 micrometers, and more preferably have an average particle size (D50) of about 1 micrometer to about 25 micrometers. Similarly to the positive electrode active material layer 34, the negative electrode active material layer 44 may further include a conductive material when necessary. This conductive material may be selected from those mentioned above.

The mass percentage of the negative electrode active materials in the entire negative electrode active material layer 44 is not limited to any particular percentage. For example, the mass percentage of the negative electrode active materials in the entire negative electrode active material layer 44 is typically about 50% or more, preferably between 90% and 99% inclusive, and more preferably between 95% and 99% inclusive. When the negative electrode active material layer 44 contains a binder, the mass percentage of the binder in the negative electrode active material layer 44 is typically between 0.01% and 10% inclusive, preferably between about 0.1% and about 7% inclusive, and more preferably between about 0.5% and about 5% inclusive relative to 100 mass % of the negative electrode active materials.

The negative electrode active material layer 44 is pressed to the extent appropriate, thus adjusting the thickness and density of the negative electrode active material layer 44. After being pressed, the negative electrode active material layer 44 typically has a thickness of 20 micrometers or more, preferably 50 micrometers or more, and has a thickness of typically 200 micrometers or less, preferably 100 micrometers or less. The density of the negative electrode active material layer 44 is not limited to any particular density. For example, the density of the negative electrode active material layer 44 is typically 1.0 g/cm$^3$ or more, preferably 1.2 g/cm$^3$ or more, and typically 2.0 g/cm$^3$ or less, preferably 1.8 g/cm$^3$ or less. The negative electrode active material layer 44 that meets these conditions enables a resulting battery to deliver high performance (e.g., high energy density and power density).

Binder

The binders serve to bond particles of materials contained in the positive and negative electrode active material layers 34 and 44, such as the electrode active materials and conductive materials, and to bond these particles to the positive and negative electrode collectors 32 and 42. Any type of binder that performs the above-mentioned functions may be used in accordance with the method for manufacturing the positive and negative electrodes 30 and 40 and application of the electrodes 30 and 40, for example. Typically, various resin materials may be used as the binders.

Specifically, preferred examples of the binders suitably used in forming composite particles (which will be described below) include a polyvinylidene fluoride (PVdF), polytetrafluoroethylene (PTFE), a tetrafluoroethylene-hexafluoropropylene copolymer (FEP), polyvinyl alcohol (PVA), a vinyl acetate copolymer, a styrene-butadiene rubber (SBR), a polyethylene oxide (PEO), and an acrylic polymer. Any of various polymer materials which functions as a binder or thickener may optionally be used in combination with one or more of these substances. Preferred examples of such a polymer material include cellulose polymers, such as carboxymethyl cellulose (CMC) and hydroxypropyl methylcellulose (HPMC).

Composite Particle

The active materials and binders to be contained in the positive and negative electrode active material layers 34 and 44 may be formed into composite particles in advance, and these composite particles may be bonded so as to provide the active material layers 34 and 44. When the active material layers 34 and further contain the conductive materials, these composite particles may further contain the conductive materials.

Figure 2:
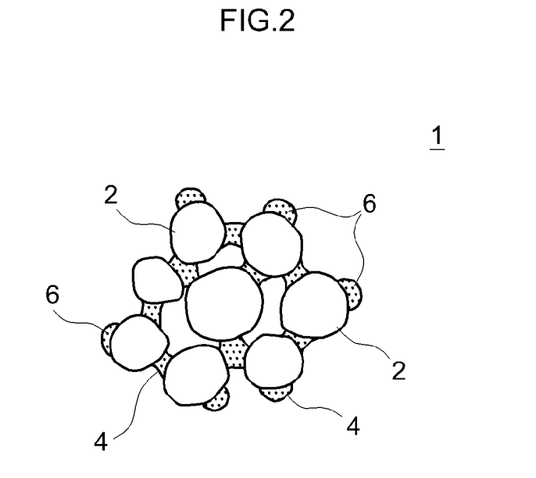
FIG. 2 is a schematic diagram illustrating the composition of a composite particle.

FIG. 2 is a schematic diagram illustrating the composition of a composite particle 1 according to the present embodiment. The composite particle 1 includes at least one particulate active material 2, and a binder 4. When the composite particle 1 includes the single particulate active material 2, the binder 4 in particulate form, for example, may adhere to the surface of the active material 2. The composite particle 1 typically includes a plurality of particulate active materials 2. In this case, the binder 4 in particulate form may adhere to the surface of each active material 2, and the active materials 2 may be bonded to each other with the binder 4. The binder 4 does not cover the entire surface of each active material 2. The composite particle 1 preferably includes the binder 4 such that uneven local distribution of the binder 4 in the interior and on the outer surface of the composite particle does not occur. In other words, the composite particle 1 preferably includes the binder 4 such that the binder 4 is distributed substantially uniformly in the interior and on the outer surface of the composite particle 1. The composite particle 1 may further include a conductive material 6. When the composite particle 1 includes the conductive material 6, the conductive material 6 is preferably distributed mainly in the binder 4 as illustrated in FIG. 2.

A method for preparing the composite particle 1 is not limited to any particular method. For example, the active materials 2 and the binder 4 may be mixed at a predetermined ratio and subjected to processes such as granulation and classification in a dry or wet state, thus preparing the composite particle 1. A material having oxidizing or reducing effect suitable for the intended electrode may be used as the active material 2. For the binder 4, a material suitable for a granulation process to be employed may be selected from various materials capable of bonding the active materials 2. Specifically, the granulation process to be employed may involve, for example, one or more of the following processes: rolling granulation; fluidized bed granulation; stirring granulation; compression granulation; extrusion granulation; grinding granulation; and spray-drying. Thus, the composite particle 1 is provided in a suitable manner. When the composite particle 1 includes the conductive material 6, the conductive material 6 may be distributed in the binder 4 in advance so that the binder 4, containing the conductive material 6, and the active materials 2 form the composite particle 1. The binder 4 may be present in any form, such as fiber form or particulate form. For example, the binder 4 is preferably present in particulate form.

The particle size of the composite particle 1 is not limited to any particular particle size. For example, the composite particle 1 preferably has an average particle size (D50) of about 5 micrometers to about 100 micrometers, and more preferably has an average particle size (D50) of about 5 micrometers to about 60 micrometers.

Separator

As illustrated in FIGS. 3 and 4, the separators 50 insulate the positive and negative electrodes 30 and 40 from each other while allowing charge carriers to move between the positive and negative electrodes 30 and 40. In this example, the separators 50 are each composed of a strip-shaped, microporous sheet material with a predetermined width. For example, microporous resin films, such as microporous polyolefin resin films, may be used as the separators 50. The separators 50 may each have a single-layer or multi-layer structure. In this example, as illustrated in FIG. 4, the negative electrode active material layer 44 is slightly larger in width than the positive electrode active material layer 34, and each separator 50 is slightly larger in width than the negative electrode active material layer 44.

Although not illustrated, each separator 50 may be provided with a heat resistance layer (HRL) on its surface. The heat resistance layer includes: heat resistance particles composed of a heat resistance material; and a binder. A material for the heat resistance particles is not limited to any particular material. For example, an inorganic oxide, such as alumina, silica, or mullite, may suitably be used for the heat resistance particles.

Battery Structure

In the example illustrated in FIG. 4, the first separator 50, the positive electrode 30, the second separator 50, and the negative electrode 40 are stacked in this order, and then wound around a winding axis WL, thus providing the wound electrode assembly 20. The positive and negative electrodes 30 and 40 are disposed so that the negative electrode active material layer 44 covers the entire width of the positive electrode active material layer 34 perpendicular to the length thereof. The first and second separators 50 are disposed to cover the entire widths of the positive and negative electrode active material layers 34 and 44. The positive electrode collector portion 36 of the positive electrode 30 and the negative electrode collector portion 46 of the negative electrode 40 are disposed to protrude from the widthwise opposite ends of the separators 50. In this example, the positive and negative electrode collector portions 36 and 46 are spirally protruded. The wound electrode assembly 20 in this example is compressed in the direction perpendicular to the winding axis WL, and thus has a flat shape conforming to the shape of the battery case 10. The wound electrode assembly 20 may alternatively have any shape that conforms to the shape of the battery case 10 to be used. For example, the wound electrode assembly 20 may have a cylindrical shape.

As illustrated in FIG. 3, in the present embodiment, the positive and negative electrode collector portions 36 and 46, protruded from the separators 50, are brought together along the direction perpendicular to the winding axis WL, for example, and are respectively connected, by welding, for example, to an extremity 64 of a positive inner terminal 62 and an extremity 74 of a negative inner terminal 72 which are provided inside the battery case 10 and under the sealing plate 14. Thus, the positive and negative electrode collector portions 36 and 46 are respectively electrically connected to the positive and negative electrode external connection terminals 60 and 70 of the sealing plate 14 through the inner terminals 62 and 72. As illustrated in FIG. 3, the electrode assembly 20 is housed in the battery case 10, with the electrode assembly 20 fixed to the sealing plate 14. A non-aqueous electrolyte solution (not illustrated) is introduced as an electrolyte into the battery case 10 through the filling port (not illustrated). The non-aqueous electrolyte solution infiltrates into the electrode assembly 20 from both sides along the winding axis WL.

Electrolyte

Any of various electrolytes conventionally used for a lithium-ion secondary battery or its equivalent may be used as the electrolyte. Typically, an electrolyte may be used in a form of a non-aqueous electrolyte solution that prepared by dissolving the electrolyte in a suitable non-aqueous solvent. Examples of the non-aqueous solvent include organic solvents, such as: ethylene carbonate; propylene carbonate; dimethyl carbonate; diethyl carbonate; ethyl methyl carbonate; 1, 2-dimethoxyethane; 1, 2-diethoxyethane; tetrahydrofuran; and 1, 3-dioxolane. As the non-aqueous solvent, one type of such organic solvents may be used alone, or two or more types of such organic solvents may be used in combination. Examples of the electrolyte (which may also be referred to as a "supporting electrolyte") to be used include lithium salts, such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$. One example of the non-aqueous electrolyte solution is prepared by dissolving $LiPF_6$ at a concentration of about 1 mol/L in a solvent mixture of ethylene carbonate and diethyl carbonate (which are mixed at a mass ratio of 1:1, for example). Instead of the non-aqueous electrolyte solution, a highly ionically conductive gel or a solid electrolyte may be used.

Charging and Discharging

The lithium-ion secondary battery 100 with the above structure is charged and discharged by movement of charge carriers (lithium ions) between the positive and negative electrodes 30 and 40.

First, when the lithium-ion secondary battery 100 is charged, an external charging power supply is connected between the positive and negative electrode external connection terminals 60 and 70, and thus power is supplied to the lithium-ion secondary battery 100. Then, lithium ions move from the positive electrode 30 to the negative electrode 40 in the electrode assembly 20 so as to satisfy a charge neutral condition. More specifically, lithium ions are released from the positive electrode active materials of the positive electrode active material layer 34 into the non-aqueous electrolyte solution. The lithium ions pass through the separators and move to the negative electrode 40 via the non-aqueous electrolyte solution. The lithium ions in the non-aqueous electrolyte solution are captured by the negative electrode active materials of the negative electrode active material layer 44, and thus stored in the negative electrode 40.

When the lithium-ion secondary battery 100 is discharged, lithium ions move from the negative electrode 40 to the positive electrode 30 in the electrode assembly 20. More specifically, lithium ions are released from the negative electrode active materials of the negative electrode active material layer 44 into the non-aqueous electrolyte solution. The lithium ions pass through the separators 50 and move to the positive electrode 30 via the non-aqueous electrolyte solution. The lithium ions in the non-aqueous electrolyte solution are captured by the positive electrode active materials of the positive electrode active material layer 34, and thus stored in the positive electrode 30. Connecting an external load between the positive and negative electrode external connection terminals 60 and 70 enables power to be drawn from the lithium-ion secondary battery 100.

Electrode Manufacturing Steps

Figure 1:
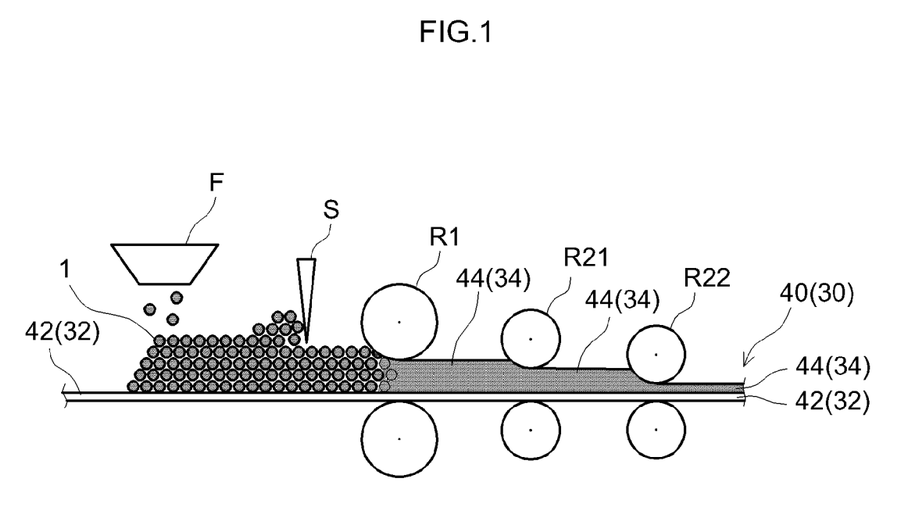
FIG. 1 is a schematic diagram illustrating steps for manufacturing an electrode sheet.

FIG. 1 is a schematic diagram illustrating manufacturing steps included in the inventive electrode manufacturing method. The inventive method for manufacturing the electrode 40 (or 30) includes:

(1) supplying the composite particles 1, each containing the active materials 2 and the binder 4, onto the sheet collector 42 (or 32); and (2) rolling the composite particles 1 supplied onto the collector 42 (or 32) to form the active material layer 44 (or 34).

Step (2) includes:

a first rolling sub-step (2-1) involving first rolling; and a second rolling sub-step (2-2) to be performed after the first rolling sub-step.

These steps will be described in more detail below.

(1) Composite Particle Supplying Step

In Composite Particle Supplying Step, the composite particles 1 are supplied onto the sheet collector 42 (or 32). As used herein, the term "collector 42 (or 32)" refers to an elongated strip-shaped collector material used as the negative electrode collector 42 or the positive electrode collector 32. The collector 42 (or 32) is conveyed along a preset conveyance path at a predetermined speed by a conveying means such as a conveyer, for example. As illustrated in FIG. 2, each composite particle 1 is a granulated particle containing the active materials 2 and the binder 4, for example. The composite particles 1 are stored in a feeder (supplier) F. A predetermined amount of the composite particles 1 is supplied onto the collector 42 (or 32) as the collector 42 (or 32) is conveyed. In this example, the composite particles 1 fall on the collector (or 32) from the feeder F through a sifter. The composite particles 1 may be supplied continuously or intermittently from the feeder F. The composite particles 1 may be supplied across the entire width of the collector 42 (or 32) perpendicular to the length thereof, or across a portion of the width of the collector 42 (or 32), such as a central portion of the collector 42 (or 32). In the example illustrated in FIG. 1, the composite particles 1 supplied onto the collector 42 (or 32) are flattened with a squeegee S. When the composite particles 1 are supplied across a portion of the width of the collector 42 (or 32), the composite particles are preferably flattened with the squeegee S such that the composite particles 1 are distributed uniformly across the surface of the collector 42 (or 32). The position of the squeegee S from the surface of the collector 42 (or 32) may be vertically adjustable. The squeegee S adjustable in position is able to remove an excessive amount of the composite particles 1 supplied onto the surface of the collector 42 (or 32). Flattening the composite particles 1 using the squeegee S in this manner provides a layer of the composite particles 1, with a substantially uniform weight per unit area of the composite particles 1 on the collector 42 (or 32).

(2) Rolling Step

In Rolling Step, the composite particles 1 supplied onto the collector 42 (or 32) are rolled into the active material layer 44 (or 34). This rolling step is multi-step rolling involving rolling the composite particles 1 twice or more, not single-step rolling involving rolling the composite particles 1 just once. The first rolling sub-step of the multi-step rolling involves performing the first rolling. The second rolling sub-step involves rolling to be performed after the first rolling sub-step.

(2-1) First Rolling Sub-Step

The first rolling sub-step includes subjecting the layer of the composite particles 1 supplied onto the collector 42 (or 32) to the first rolling. The first rolling is characterized by the use of a pair of rubber rolls R1 disposed in balance with a predetermined distance (gap) therebetween. A rubber material constituting the surfaces of the rolls R1 lightly presses the layer of the composite particles 1. The composite particles 1 that have just been supplied from the feeder F or have been flattened with the squeegee S are in a naturally packed state, and are relatively lightly pressed by this rolling. This fills interstices between the composite particles 1 without causing cracks in the composite particles 1, thus increasing the density of the layer of the composite particles 1.

If a large pressure is applied to the composite particles 1 at a time to form an active material layer with a relatively high density, the active materials 2 contained in the composite particles 1 may crack. Cracking in the active materials 2 increases the specific surface area of the active materials 2. The increase in the specific surface area of the active materials 2 in turn may lead to degradation in storage characteristics of the resulting lithium-ion secondary battery 100, especially at high temperature. In terms of the storage characteristics of the lithium-ion secondary battery 100, cracking in the active materials 2 is a phenomenon that should be avoided. Cracking in the active materials 2 is likely to occur particularly when the crystalline structures of the active materials 2 are layered or when substances constituting the active materials 2 have cleavability.

Rolling in the first rolling sub-step may be performed only once, or may be performed more than once until the active material layer has a predetermined density. A target density for the first rolling sub-step may be decided in consideration of a final target density and the extent of rolling in the second rolling sub-step (which will be described below), for example. Specifically, the target density for the first rolling sub-step is preferably between about 110% and about 200% inclusive and more preferably between about 120% and about 180% inclusive relative to the initial density, for example. The target density for the first rolling sub-step which is below 110% relative to the initial density is not preferable, because such a density may cause the composite particles 1, which is in a packed state resulting from a substantially free fall, to come off or slide down, making it impossible to provide a stable layer (or filmy layer). The target density for the first rolling sub-step which is higher than 200% relative to the initial density is also not preferable, because such a density may cause cracking in the active materials 2 as mentioned above.

As used herein, the term "initial density" refers to the density of an active material layer prior to the first rolling sub-step. For example, the term "initial density" may refer to the bulk density of the composite particles 1 supplied onto the collector 42 (or 32) and flattened with the squeegee S.

(2-2) Second Rolling Sub-Step

The second rolling sub-step includes rolling to be performed after the first rolling sub-step. In the second rolling sub-step, the layer of the composite particles 1 is rolled with a pair of reduction rolls R21 and a pair of reduction rolls R22, each disposed in balance with a predetermined distance (gap) therebetween. Any material may be used for the reduction rolls R21 and R22 employed in the second rolling sub-step, which means that various reduction rolls R21 and R22 capable of achieving the target density of the active material layer 44 (or 34) may be used. For example, preferred examples of the reduction rolls R21 and R22 include metal rolls whose rolling surfaces are composed of a metal material. Firmly pressing the layer of the composite particles 1 with the hard surfaces of the rolls, which are composed of a metal material, further increases the density of the layer of the composite particles 1 whose interstices have been filled in the first rolling sub-step. This means that rolling in the second rolling sub-step is performed with a larger pressure (linear pressure), for example.

Also in the second rolling sub-step, rolling may be performed only once, or may be performed more than once until the active material layer 44 (or 34) has a target density. Rolling in the second rolling sub-step is preferably performed twice or more with the use of the pairs of reduction rolls R21 and R22. This sufficiently increases the density of the active material layer 44 (or 34) while reducing cracking in the active materials 2, even with the use of the reduction rolls composed of a material other than rubber. Consequently, these steps make it possible to manufacture the electrode 40 (or 30) including the high density active material layer 44 (or 34) that enables the resulting battery to offer high storage characteristics.

As described above, the manufacturing method disclosed herein involves supplying the composite particles 1 in powder form onto the collector 42 (or 32), and then rolling the composite particles 1. For example, in a conventional method, slurry prepared by dispersing the composite particles 1 in a solvent is supplied onto the collector 42 (or 32), dried, and then rolled. Compared with such a method, the inventive method requires a large pressure at the time of rolling. In other words, the inventive method requires a larger pressure in order to achieve the target density of the active material layer 44 (or 34). The method disclosed herein, however, involves applying a large pressure to the layer of the composite particles 1 by performing rolling in multiple steps. This enables the density of the active material layer 44 (or 34) to reach a desired high value while reducing cracking in the active materials 2.

Note that at least one of the pairs of reduction rolls R21 and R22 may be porous or suction rolls, for example, and may more preferably be porous or suction rolls composed of ceramic or metal. As used herein, the term "porous roll" may refer to a roll composed of a porous material, for example, or a roll whose surface has microscopic asperities or through holes provided by any of various processes, such as texturing (see JP 2012-216285 A, for example). Such a porous roll has enhanced gripping force and following ability at its surface. Thus, such a porous roll is capable of rolling and conveying an object to be rolled, without causing the object to slide over the roll surface, for example. The term "suction roll" may refer to a roll whose roll surface is provided with a large number of micropores in communication with a pressure regulating path inside the roll so as to be able to suck an object to be rolled. The pressure regulating path of the suction roll is connected with, for example, a negative pressure source so as to enable the suction roll to suck the object to the roll surface. Thus, such a suction roll is capable of rolling and conveying the object without causing the object to slide over the roll surface, while sucking the object to the roll surface.

The term "suction roll" may refer to a hollow (or typically cylindrical), porous roll that is composed of a porous material or a material whose surface is provided with a large number of microscopic through holes, and that internally includes a hollow portion in communication with a pressure regulator so as to suck an object to be rolled (see JP 03-57159 A, for example). The hollow portion of the suction roll is connected with, for example, a negative pressure source, thus enabling the suction roll to suck the object to the roll surface.

Consequently, such a suction roll used at least as the reduction roll that comes into contact with the collector is capable of rolling and conveying the electrode collector without causing the collector to slide over the roll surface even at high speed, while sucking the rolled collector to the roll surface.

Furthermore, such porous and suction rolls used at least as the reduction rolls that come into contact with the active material layer are capable of rolling the composite particles 1 while sucking the composite particles 1. Thus, when the composite particles 1 are insufficiently flattened with the squeegee S, for example, the suction roll preferentially sucks an excessive portion of the composite particles 1, thus enabling the composite particles 1 held uniformly on the surface of the suction roll to be rolled. As a result, the state of stacking the composite particles 1 are uniformized, which further reduces variations in weight per unit area of the active materials. Note that the porous and suction rolls are typically conveying rolls that are conventionally used to convey an organic polymer film in a wrinkle-free manner. The manufacturing method disclosed herein is novel in that such conveying rolls are used to further increase the quality of rolling.

In general, if porous and suction rolls having uneven surfaces are used as the reduction rolls, the active materials 2 may disadvantageously go into the asperities of the roll surfaces. The technique disclosed herein, however, allows the active materials 2 in the composite particles 1 to have a relatively large particle size at the time of rolling. Thus, the active materials 2 in the composite particles 1 are suitably prevented from going into the asperities of the roll surfaces.

The pressure regulator connected to the suction roll (or the porous roll) may be configured not only to depressurize the hollow portion of the suction roll (or the porous roll) so as to suck an object to be rolled, but also to pressurize the hollow portion. Thus, the electrode (i.e., the electrode collector and/or active material layer) sucked to the roll surface through the through holes of the suction roll (or the porous roll), for example, is detached (separated) from the roll surface smoothly.

At least one of rolling processes performed in the first and second rolling sub-steps is preferably "heat-rolling" in which rolling is performed with heated reduction rolls. Such heat-rolling causes the binder 4 contained in the composite particles 1 to soften or melt. This allows the composite particles 1 to bond to each other more firmly so as to provide the active material layer 44 (or 34) with higher strength, and also allows the active material layer 44 (or 34) and the collector 42 (or 32) to bond to each other securely. Note that heat-rolling is preferably performed in the second rolling sub-step. This makes the resulting active material layer 44 (or 34) more dense. In particular, heat-rolling the active material layer 44 (or 34), whose density has been increased in the first rolling sub-step, makes it possible to further increase not only the density of the composite particles 1 but also the density of the active materials 2 contained in the composite particles 1. Consequently, the density of the active material layer 44 (or 34) is further increased.

The heating temperature during heat-rolling may suitably be decided in accordance with the binder 4 contained in the composite particles 1. For example, the heating temperature may be decided on the basis of the glass transition temperature, softening point and/or melting point of the binder 4. As a rule of thumb, heat-rolling may be performed at a temperature ranging from about 60° C. to about 180° C., for example.

Note that heat-rolling is not limited to heating the reduction rolls during rolling. The layer of the composite particles 1 immediately before being conveyed to the reduction rolls may be heated in a non-contact manner using infrared rays, far infrared rays, or laser, for example. Alternatively, warm air or hot air may be blown to heat the layer of the composite particles 1. In that case, however, care must be taken so that the composite particles 1 will not be blown off or the degree of compactness of the composite particles 1 will not be affected by the warm air or hot air.

In the manufacturing method disclosed herein, the weight per unit area of the rolled active material layer 44 (or 34) may be determined by in-line measurement. This makes it possible to check whether the target weight per unit area of the active materials 2 is achieved. In the case where the weight per unit area of the active material layer 44 (or 34) does not fall within a predetermined range, the amount of the composite particles 1 supplied from the feeder F and the vertical position of the squeegee S, for example, may be adjusted. For example, when the measured weight per unit area falls below the predetermined range, the amount of the composite particles 1 supplied from the feeder F may be increased, and the vertical position of the squeegee S may be raised. In contrast, when the measured weight per unit area exceeds the predetermined range, the amount of the composite particles 1 supplied from the feeder F may be reduced, and the vertical position of the squeegee S may be lowered. Thus, the amount of the composite particles 1 supplied onto the collector 42 (or 32) before the first rolling sub-step is adjusted. In other words, the weight per unit area of the active materials 2 is adjusted. Although not illustrated, the measurement of the weight per unit area is enabled, for example, by providing a weight per unit area measuring device at a position downstream of at least one or more of the rolls R1, R21, and R22. Specifically, the weight of the collector 42 (or 32) and the active material layer 44 (or 34) conveyed after rolling is measured with the weight per unit area measuring device. Then, the known weight of the collector 42 (or 32) is subtracted from the measured weight, thus calculating the weight per unit area of the active material layer 44 (or 34). Note that the height (or thickness) of the active material layer 44 (or 34) may be measured with, for example, a position controller for the vertical position of the squeegee S so as to calculate the density of the active material layer before the first rolling sub-step (i.e., the initial density of the active material layer).

In the manufacturing method disclosed herein, the density of the rolled active material layer 44 (or 34) may be determined by in-line measurement, for example, so as to control the density of the rolled active material layer 44 (or 34). The density of the rolled active material layer 44 (or 34) may be controlled by adjusting the extent of rolling in the first and second rolling sub-steps on the basis of the weight per unit area of the active materials and/or initial density of the active material layer 44 (or 34) measured in advance. The actual thickness of the rolled active material layer may be measured to check whether the target density of the active material layer 44 (or 34) is achieved. In the case where the density of the active material layer 44 (or 34) does not fall within a predetermined range, the amount of the composite particles 1 supplied from the feeder F, the vertical position of the squeegee S, the gap between the reduction rolls R1, the gap between the reduction rolls R21, and the gap between the reduction rolls R22, for example, may be adjusted. For example, when the measured density falls below the predetermined range, the amount of the composite particles 1 supplied from the feeder F may be increased, the vertical position of the squeegee S may be raised, and/or the gap between the reduction rolls R1, the gap between the reduction rolls R21, and the gap between the reduction rolls R22 may be narrowed. In contrast, when the measured density exceeds the predetermined range, the amount of the composite particles 1 supplied from the feeder F may be reduced, the vertical position of the squeegee S may be lowered, and/or the gap between the reduction rolls R1, the gap between the reduction rolls R21, and the gap between the reduction rolls R22 may be widened. Thus, the amount of the composite particles 1 supplied onto the collector 42 (or 32) before the first rolling sub-step and the thickness of the rolled active material layer 44 (or 34) are adjusted. Although not illustrated, in addition to the weight per unit area measuring device, a thickness measuring device for the active material layer 44 (or 34) may be provided downstream of a rolling section (i.e., the reduction rolls R1, R21, or R22). The thickness of the active material layer 44 (or 34) conveyed after rolling is measured with this thickness measuring device. Then, the calculated weight per unit area is divided by the measured thickness, thus calculating the density of the active material layer 44 (or 34).

The electrode 40 (or 30) manufactured by the above-described manufacturing method includes: the collector 42 (or 32); and the active material layer 44 (or 34), i.e., the layer of the active materials 2 bound with the binder 4, which is disposed on the collector 42 (or 32). The active materials 2 in the composite particles 1 are used in particulate form to provide the active material layer 44 (or 34) of the electrode 40 (or 30) to be manufactured. Thus, there is no need to prepare an active material layer-forming paste containing the active materials 2.

This allows the active materials 2 and the binder 4 to form the active material layer 44 (or 34), with the active materials 2 and the binder 4 kept dispersed in the composite particles 1. When the composite particles 1 contain the conductive material 6, the active materials 2, the binder 4, and the conductive material 6 are allowed to form the active material layer 44 (or 34), with the active materials 2, the binder 4, and the conductive material 6 kept dispersed in the composite particles 1. This prevents uneven distribution of the small particle size active materials 2 and conductive material 6, for example, at the surface or bottom of the active material layer 44 (or 34), resulting from dimensions and specific gravities of these materials. Consequently, the inventive method makes it possible to manufacture the electrode including the active material layer 44 (or 34) in which the active materials 2, the binder 4, and the conductive material 6, for example, are distributed evenly.

Furthermore, a solvent contained in an active material layer-forming paste does not have to be removed by drying in forming the active material layer 44 (or 34). In other words, the manufacturing method disclosed herein requires no drying step. This enables energy saving, and reduces the time required to manufacture the electrode, resulting in a further reduction in manufacturing cost.

The above-described electrode manufacturing method is suitably employed to manufacture the electrode 40 (or 30) in which graphite particles, for example, are used as the active materials 2. Graphite particles have cleavability owing to crystalline structures thereof, and are thus likely to crack during rolling. The electrode manufacturing method disclosed herein, however, enables the electrode 40 (or 30), in which graphite particles are used as the active materials 2, to improve storage characteristics of a resulting battery.

The above-described electrode manufacturing method is also suitably employed to manufacture the electrode 40 (or 30) including the active material layer 44 (or 34) that contains, for example, the conductive material 6 in addition to the active materials 2. The conductive material 6 is generally smaller in particle size than the active materials 2, and is likely to be unevenly distributed, particularly in the thickness direction of the active material layer 44 (or 34). The electrode manufacturing method disclosed herein, however, makes it possible to manufacture the electrode in such a manner as to prevent uneven distribution of the active materials 2, the binder 4, and the conductive material 6 in the thickness direction of the active material layer 44 (or 34). In other words, the electrode manufacturing method disclosed herein makes it possible to manufacture the electrode of higher quality.

Exemplary methods according to the present invention will be described below. Note that the present invention is not limited to the exemplary methods described below.

Negative electrode sheets for lithium-ion secondary batteries were fabricated by Exemplary Methods 1 to 3 described below.

Preparation of Composite Particles

First, scaly natural graphite was shaped into a sphere, thus preparing spherical graphite (with an average particle size of 30 micrometers) as negative electrode active materials. The spherical graphite and an acrylic resin, serving as a binder, were mixed such that the mass ratio between these materials was 92.5:7.5. Then, this mixture was introduced with a small amount of water into a dry particle composing machine (e.g., Nobilta NOB-130 produced by HOSOKAWA MICRON CORPORATION), where a disperser was operated at 3 kW to carry out mixing for about 10 hours, thus providing composite particles (granulated particles) with an average particle size of about 60 micrometers.

Fabrication of Negative Electrode Sheet

Exemplary Method 1

First Rolling Step

Subsequently, the composite particles were stored in a powder feeder, and supplied at a predetermined supply rate onto an approximately 10 micrometers thick, elongated copper foil (negative electrode collector) transported on a conveyor. Using a squeegee equipped with a height sensor, an excessive amount of the composite particles supplied onto the negative electrode collector was scraped off, so that the height of the composite particles was made uniform across the width of the negative electrode collector. Then, the composite particles were conveyed, together with the negative electrode collector, to a first rolling section. While the composite particles were conveyed, the weight per unit area of the composite particles supplied onto the negative electrode collector was measured with an in-line weight per unit area measuring device. The bulk density of the composite particles, calculated from the measured weight per unit area and the height of the squeegee, was determined to be an initial density. The initial density was measured each time the negative electrode collector was conveyed by a predetermined length.

In the first rolling section, a pair of rubber rolls, serving as press rolls, was installed. The distance (gap) between the rubber rolls was adjusted so as to apply a predetermined pressure during rolling. In the first rolling section, the composite particles conveyed together with the negative electrode collector were rolled such that the density was increased by 120% relative to the initial density. The negative electrode collector and composite particles that had passed through the first rolling section were subsequently conveyed to a second rolling section.

Second Rolling Step

In the second rolling section, a pair of metal rolls, serving as press rolls, was installed. In a third rolling section downstream of the second rolling section, another pair of metal rolls, serving as press rolls, was installed. The distance (gap) between the metal rolls in the second rolling section and the distance (gap) between the metal rolls in the third rolling section were each adjusted when necessary on the basis of the initial density measured in advance at a predetermined position of the negative electrode collector, so as to enable the density of the active material layer to reach a final target density. In the second rolling step, the composite particles conveyed together with the negative electrode collector were rolled twice such that the final target density was reached, i.e., the density was increased by 182%, 212%, or 240% relative to the initial density. We determined that the composite particles, which had passed through the second rolling section, were bonded to each other to form the negative electrode active material layer. We also determined that the negative electrode active material layer was combined with the negative electrode collector. Thus, negative electrode sheets with the three different densities were manufactured. Each negative electrode sheet was cut into a predetermined size and used to make a secondary battery described below.

Exemplary Method 2

Negative electrode sheets were fabricated similarly to Exemplary Method 1 except that metal rolls were used instead of the rubber rolls in the first rolling step. In other words, rolling was performed three times using the metal rolls to fabricate the negative electrode sheets with the three different densities.

Exemplary Method 3

Negative electrode sheets were fabricated similarly to Exemplary Method 1 except that the first rolling step was eliminated and rolling was performed only once using metal rolls in the second rolling step. In other words, rolling was performed only once using the metal rolls to fabricate the negative electrode sheets with the three different densities.

Properties of Negative Electrode Sheets

Figure 5:
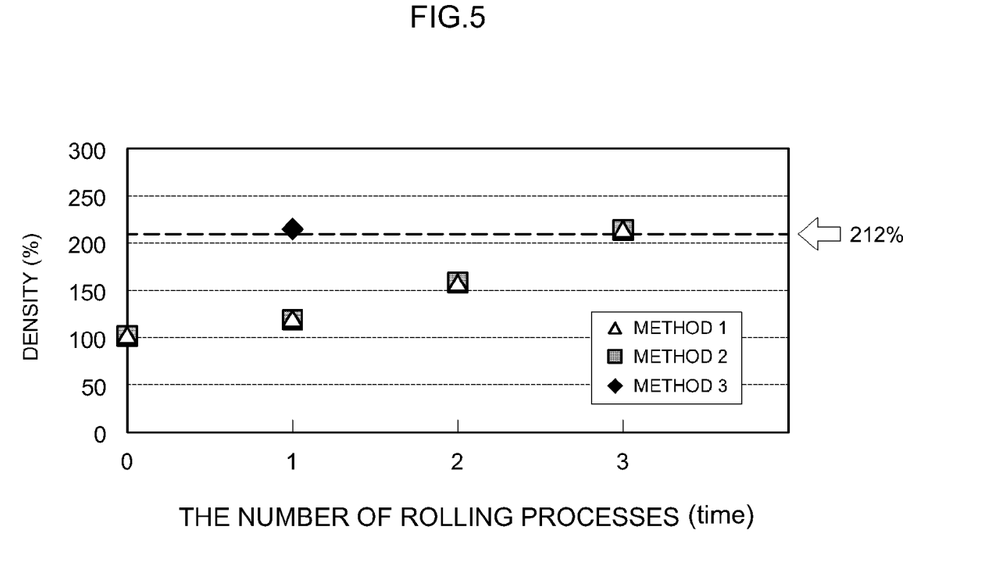
FIG. 5 is a graph illustrating the relationship between the numbers of rolling processes and the densities of negative electrode active material layers for negative electrodes manufactured by different methods.

Table 1 indicates actual final densities (%) relative to the initial density and specific surface areas which were measured for the negative electrode active material layers of the negative electrode sheets fabricated as described above. Note that the specific surface areas were measured by BET method. FIG. 5 illustrates the relationship between the numbers of rolling processes and the electrode densities of the negative electrode active material layers relative to the initial density, which were obtained by Exemplary Methods 1 to 3, when the final target density was set at 212%. Note that Table 1 indicates average values obtained for 10 negative electrode sheets for measurement which were cut from each negative electrode sheet manufactured for a lithium secondary battery described below. In this example, the weight per unit area of the composite particles was determined by in-line measurement, and the extent of rolling (i.e., the inter-roll gap) was decided on the basis of the measured weight per unit area, so that there were only slight variations in the measurement values among the 10 negative electrode sheets for measurement.

Fabrication of Lithium Secondary Battery for Evaluation
Fabrication of Positive Electrode Sheet Next, $LiNi_{1/3}Co_{1/3}Mn_{1/3}O_2$ powder (positive electrode active materials), AB (conductive material), and PVdF (binder) were mixed at a mass ratio of 94:3:3 with NMP (solvent) to prepare a composition in paste form. This composition was applied to an approximately 15 micrometers thick, elongated aluminum foil (positive electrode collector), dried, and then pressed into a positive electrode sheet by a flat press.

Then, the fabricated positive and negative electrode sheets were stacked and wound, with separators (e.g., PP/PE/PP three-layer microporous sheets) interposed therebetween, and the resulting wound electrode assembly was crushed laterally and thus flattened. Positive and negative electrode terminals were respectively welded to end portions of the positive and negative electrode collectors of the wound electrode assembly.

The electrode assembly was housed in a rectangular battery case composed of an Al alloy, and a non-aqueous electrolyte solution was injected into the battery case. The non-aqueous electrolyte solution used was prepared as follows: $LiPF_6$ (electrolyte) was dissolved at a concentration of about 1 mol/L in a solvent mixture containing ethylene carbonate (EC), ethyl methyl carbonate (EMC), and dimethyl carbonate (DMC) at a volume ratio of 3:4:3. Then, a lid was attached and welded to an opening of the battery case, thus providing a lithium secondary battery of Sample 1. Note that 10 lithium secondary batteries were fabricated similarly for each of Samples 1 to 3 for each of Exemplary Methods 1 to 3. The rated capacity of each of these batteries was 40 Ah.

Battery Storage Characteristics

The lithium secondary batteries of Samples 1 to 3, fabricated as described above, were each subjected to conditioning in accordance with the steps below:

(1) Each battery was charged with a constant current at a rate of 1 C (40 A) until 4.1 V was reached;

(2) Charging was suspended for 5 minutes;

(3) Each battery was discharged with a constant current at a rate of 1 C (40 A) until 3.0 V was reached; and (4) Discharging was suspended for 5 minutes.

To determine an initial capacity, each battery subjected to the conditioning was then charged and discharged at a temperature of 25° C. in the voltage range of 3.0 V to 4.1 V in accordance with the steps below:

(1) Each battery was charged with a constant current at a rate of 1 C (40 A) until 4.1 V was reached, and then charged with a constant voltage until a rate of 0.1 C (4 C) was reached;

(2) Charging was suspended for 5 minutes;

(3) Each battery was discharged with a constant current at a rate of 1 C (40 A) until 3.0 V was reached, and then discharged with a constant voltage until a rate of 0.1 C (4 A) was reached; and (4) Discharging was suspended for 5 minutes.

The resulting discharge capacity (i.e., a total sum of the products of current and voltage values) was determined to be the initial capacity. We determined that the batteries fabricated each had an initial capacity of about 24 Ah, and thus there was little difference among the initial capacities of the batteries.

Each battery for which the initial capacity had been determined was charged to an SOC of 80%, and then stored at 60° C. for 10 days. Subsequently, the post-storage capacity of each battery was measured by a method similar to that used in measuring the initial capacity. Then, storage characteristics were calculated from the initial and post-storage capacities by the following equation:

Storage Characteristics (%)=(Post-Storage Capacity)/(Initial Capacity)×100

The storage characteristics calculated are listed in Table 1 below.

TABLE 1

| Method | Rolling Process | Final Density (%) | Specific Surface Area (m²/g) | Storage Characteristics (%) |
|---|---|---|---|---|
| 1 | Rubber Rolls & Metal Rolls (Twice) | 182 | 2.10 | 93 |
|   |   | 211 | 2.22 | 90 |
|   |   | 239 | 2.31 | 87 |
| 2 | Metal Rolls (Three Times) | 183 | 2.13 | 91 |
|   |   | 213 | 2.32 | 86 |
|   |   | 242 | 2.43 | 79 |
| 3 | Metal Rolls (Once) | 180 | 2.15 | 90 |
|   |   | 214 | 2.38 | 83 |
|   |   | 240 | 2.63 | 75 |

As indicated in Table 1, rolling was performed by three different rolling methods, i.e., Exemplary Methods 1 to 3, to form negative electrode active material layers of three different densities in each method such that final densities of about 182%, about 212%, and about 240% were achieved. We determined that in each rolling method, the higher the final density of the negative electrode active material layer, the greater the BET specific surface area. We also determined that the BET specific surface area varies greatly depending on the rolling method.

Specifically, comparisons between Exemplary Methods 2 and 3 indicate that the specific surface areas of the active materials obtained by multi-step rolling using metal rolls are smaller than those obtained by conventional single-step press-rolling using metal rolls, although the electrode densities are substantially equal. An increase in the specific surface area of the negative electrode active material layer caused by rolling may be due to cracking in the active materials. In other words, unlike single-step press-rolling, multi-step press-rolling increases the density of the electrode while preventing cracking in the active materials.

Comparisons between Exemplary Methods 1 and 2 indicate that the increase in the specific surface area resulting from rolling using rubber rolls is smaller than that resulting from rolling using metal rolls. We thus determined that cracking in the active materials during rolling was further reduced when rolling was performed using rubber rolls.

Note that the specific surface area of the active material layer and the battery storage characteristics are known to have an inverse relationship to each other. The results in Table 1 clearly show that the battery storage characteristics degrade with increasing specific surface area of the negative electrode active material layer. This confirms that the use of multi-step rolling, such as Exemplary Methods 1 and 2, particularly Exemplary Method in which rubber rolls are used for the initial rolling, in manufacturing an electrode makes it possible to manufacture a battery with excellent storage characteristics.

Note that compacting the active material layer by a single rolling process (i.e., single-step rolling) naturally requires larger compressive stress, which may result in cracking in the active materials and eventually lead to degradation in storage characteristics. In contrast, compacting the active material layer by a plurality of rolling processes (i.e., multi-step rolling) requires less compressive stress, thus suitably reducing cracking in the active materials and preventing degradation in storage characteristics. Rolling-induced cracking in the active materials is likely to occur when the active materials are sparse and have large dimensions. In view of this, in order to effectively prevent cracking in the active materials, a rolling process in which rubber rolls are used is preferably the first one of a plurality of rolling processes to be performed.

The method of manufacturing a lithium-ion secondary battery negative electrode has been described by way of example in the above embodiment. Naturally, the lithium-ion secondary battery electrode manufacturing method disclosed herein may also be used to manufacture a positive electrode. In the above embodiment, typical metal rolls with non-porous surfaces are used as exemplary reduction rolls other than rubber rolls. It is, however, evident to those skilled in the art that porous rolls and/or suction rolls, for example, may be used as such metal rolls. Such porous rolls may be composed of a porous material, such as porous ceramic. Such suction rolls may be cylindrical, porous rolls with through holes and hollow portions configured to enable suction. Lithium-ion secondary batteries disclosed herein exhibit superior storage characteristics to offer excellent battery performance, and thus find use in various applications. For example, lithium-ion secondary batteries disclosed herein are suitably used in an application that requires high energy density and/or power density. Such an application may be a motor power source (driving power source) installed on a vehicle, for example. The vehicle is not limited to any particular type of vehicle. Examples of the vehicle include a plug-in hybrid vehicle (PHV), a hybrid vehicle (HV), an electric vehicle (EV), an electric truck, a motorbike, a motor-assisted bicycle, a motorized wheelchair, and an electric railway. Note that a plurality of the lithium-ion secondary batteries may be connected in series and/or in parallel so as to be used as a battery pack.

REFERENCE SIGNS LIST 1 composite particle
2 active material
4 binder
6 conductive material
10 battery case
12 case body
14 sealing plate
20 electrode assembly
30 positive electrode (positive electrode sheet)
32 positive electrode collector
34 positive electrode active material layer
36 positive electrode collector portion
40 negative electrode (negative electrode sheet)
42 negative electrode collector
44 negative electrode active material layer
46 negative electrode collector portion
50 separator
60 positive electrode external connection terminal
70 negative electrode external connection terminal
62, 72 inner terminal
64, 74 extremity
100 lithium-ion secondary battery

The invention claimed is:

1. A method of manufacturing a lithium-ion secondary battery electrode, the method comprising:
supplying granulated composite particles, each of the composite particles containing an active material and a binder, onto a sheet collector in a powder form; and
rolling the composite particles supplied onto the collector to form an active material layer, wherein
the granulated composite particles are prepared by spray-drying,
the rolling step includes a first rolling sub-step involving first rolling, and a second rolling sub-step to be performed after the first rolling sub-step, and
the first rolling is rubber rolling using a pair of rubber rolls.

2. The method according to claim 1, further comprising:
flattening the composite particles, supplied onto the collector, using a squeegee, wherein the flattening step precedes the first rolling sub-step.

3. The method according to claim 2, further comprising:
controlling a vertical position of the squeegee, thus adjusting an amount of the composite particles supplied onto the collector.

4. The method according to claim 1, wherein rolling is performed more than once in the second rolling sub-step.

5. The method according to claim 1, wherein at least one of the first rolling sub-step and the second rolling sub-step is heat-rolling.

6. The method according to claim 1, further comprising:
measuring a weight per unit area of the composite particles supplied onto the collector, and adjusting an extent of the rolling in the first rolling sub-step and/or the second rolling sub-step on a basis of the measured weight per unit area, wherein
the measuring and adjusting step is performed at any point between the supplying step and the second rolling sub-step.

7. The method according to claim 1, wherein the first rolling achieves a first target density of the composite particles, and the second rolling achieves a second target density of the composite particles, and the density of the composite particles is increased by the second rolling sub-step.

8. The method according to claim 7, wherein the first target density is 110% to 200% relative to an initial density of the composite particles prior to the first rolling sub-step, and the second target density is 240% or less relative to the initial density of the composite particles.

9. The method according to claim 8, wherein the first target density is 120% to 180% relative to the initial density of the composite particles.

10. The method according to claim 8, wherein the second target density is 212% or less relative to the initial density of the composite particles.

11. The method according to claim 8, wherein the second target density is 183% or less relative to the initial density of the composite particles.

12. The method according to claim 8, wherein the first target density is 110% to 120% relative to the initial density of the composite particles.

13. The method according to claim 12, wherein the second target density is 183% or less relative to the initial density of the composite particles.

14. The method according to claim 1, where the second rolling sub-step involves second rolling performed after the first rolling sub-step,
the second rolling is metal rolling using a pair of metal rolls,
the active material layer is not heated before the first rolling sub-step, and
the active material layer is not heated during the first rolling sub-step.

* * * * *